(12) United States Patent
Chong

(10) Patent No.: US 8,161,164 B2
(45) Date of Patent: Apr. 17, 2012

(54) AUTHORIZING SERVICE REQUESTS IN MULTI-TIERED APPLICATIONS

(75) Inventor: Frederick Chen Lai Chong, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 879 days.

(21) Appl. No.: 11/414,584

(22) Filed: Apr. 28, 2006

(65) Prior Publication Data

US 2007/0255841 A1 Nov. 1, 2007

(51) Int. Cl.
*G06F 15/16* (2006.01)
*G06F 7/04* (2006.01)
(52) U.S. Cl. ...................... 709/227; 726/4; 726/5; 726/9
(58) Field of Classification Search .................. 709/229; 726/4, 5, 9
See application file for complete search history.

(56) References Cited

U.S. PATENT DOCUMENTS

| 6,609,198 B1* | 8/2003 | Wood et al. ............... 713/155 |
| 2003/0149871 A1* | 8/2003 | Medvinsky ............... 713/155 |
| 2004/0128393 A1* | 7/2004 | Blakley et al. ........... 709/229 |

* cited by examiner

*Primary Examiner* — Moustafa M Meky
*Assistant Examiner* — Hee Kim
(74) *Attorney, Agent, or Firm* — Workman Nydegger

(57) ABSTRACT

Services of a multi-tier application can authorize (e.g., including authenticating) each other with one or more service access tokens provided by a security token service. In one implementation, an end-user can authenticate with the security token service to obtain one or more security tokens for communicating with an upstream application service. Requests that involve further processing from downstream services of the application can also involve service authorization/authentication measures. Thus, the upstream application service can also authenticate with the security token service to obtain one or more security tokens, such as a session token, and a service access token. The service access token for the upstream service can also include one or more signed policy settings. The upstream service can then use the one or more security tokens to prove authority to communicate with a downstream service in accordance with the policy settings.

12 Claims, 3 Drawing Sheets

AUTHORIZING SERVICE REQUESTS IN MULTI-TIERED APPLICATIONS

CROSS-REFERENCE TO RELATED APPLICATIONS

N/A

BACKGROUND

1. Background and Relevant Art

As computer systems have increased in popularity, so have the needs to distribute files and processing resources of computer systems in networks both large and small. In general, computer systems and related devices communicate information over a network for a variety of reasons, for example, to exchange personal electronic messages, sell merchandise, provide account information, and so forth. One will appreciate, however, that as computer systems and their related applications have become increasingly more sophisticated, the challenges associated with sharing data and resources (e.g., a "device," "application," or "application component") on a network have also increased.

One way in which organizations might distribute resources is through the use of tiered applications. With respect to network systems for example, an organization might segment an application into sets of tiered services, where one service of an application at one network location might be configured to perform a specific task, and then communicate the results of that task through network communication protocols with another service of the application at another network location. One reason for distributing an application's services in this manner can be simply to avoid overburdening a particular computer system with a wide range of computing requests for a large number of users, such as might be requested of a web server. For example, an organization might see a computational benefit for isolating some application services at a front-end web server, and isolating other services in the application at more downstream-located services behind the front-end web server.

Additional reasons for distributing an application's services include certain security benefits. For example, the organization might maintain a database of sensitive information through a service at an internal computer system (i.e., a "downstream service") that is behind a firewall. This is generally understood as the "defense-in-depth principle." As such, an end-user desiring to access the database data (i.e., at the "downstream service") will need to initiate a request through the front-end web service (i.e., "upstream service"). If the end-user is appropriately authenticated, the front-end web service of the application might then send a separate, internal request to the downstream database service at the internal computer system. The database service could then return the requested result back to the front-end web service, which then delivers the information to the end-user. Such a configuration can thus provide an end-user with access to certain internal information, while also guarding to some extent direct access to the an application's various levels of downstream services at internal computer system(s).

To reap the security benefits mentioned above, however, an organization will generally need to address additional considerations, such as how to limit the execution of mission critical code at downstream services to a set of trusted identities. In addition, the organization might be concerned with how to enable downstream services to make access control decisions based on the identity of the end-user making the application service requests. These and other similar considerations might be further complicated by regulations that mandate that businesses keep on audit trail of all data related activities, regarding who accessed what data and when.

Some organizations attempt to solve these difficulties by configuring downstream services to operate in accordance with trust levels for properly authenticated end-users. In particular, downstream services might be configured to trust process requests relayed by upstream services (e.g., the front-end web service) only if the upstream services are "impersonating" a properly authenticated end-user. For example, a front-end web service might receive an outside end-user request that includes some end-user authentication information (e.g., user name and password). The front-end web service might then relay the request to an internal application service at an internal computer system on behalf of the end-user, such as by providing the end-user's supplied user name (e.g., using Kerberos mechanisms). The downstream service might, in turn, be configured to only accept and process the request from the upstream service if the downstream service can also authenticate the supplied user name.

However, impersonation-based configurations also introduce the issue of process privilege elevation, which can result in more damages in the event of security compromises. Furthermore, some impersonation-delegation systems may require the upstream service to obtain a service ticket on behalf of the outside end-user from a security authority before allowing the upstream service to access and/or invoke downstream services. Such security negotiation with a security authority can introduce extra communication latency, particularly for application services that may be acting on behalf of a large number of users. Unfortunately, simply caching security contexts across multiple outside requests can violate stateless recommendations for high performance application services.

This difficulty can extend into additional implementations otherwise thought of as network optimizations. For example, some application services may be configured to share a pool of preset communication channels for connecting and communicating with downstream services. In particular, an organization might desire for some business logic-tier services to pool database connections to a downstream database in order to optimize performance. With impersonated connections, however, the downstream database may be required to authenticate each connection, which thus undermines the potential optimizations of pooling.

Furthermore, a couple of additional problems can flow from configurations where downstream services are secured only with a specified user's identity. At the outset, for example, such a configuration can provide end-users with the ability to invoke business logic services, which can also increase the complexity of managing access control for a particular service. In addition, such a configuration may allow any type of application service in the system to make an impersonation, and thus potentially allow any upstream service to call mission-critical code. Such a configuration, therefore, violates a particular view of the defense-in-depth principle, which suggests that there should be a gradual reduction of the number of identities that can access higher value assets (e.g., those managed by downstream services). In particular, the defense-in-depth principle suggests that inner business logic services should be restricted to a gradually smaller set of application identities in the downstream direction.

Accordingly, there are a number of difficulties associated with securing multi-tiered application communications.

BRIEF SUMMARY

Implementations of the present invention provide systems, methods, and computer program products configured to secure communications between services of a multi-tiered application system. In particular, implementations of the present invention provide components and mechanisms for securing communications between application services that may be operating at one or more different nodes. In one implementation, for example, an upstream service in a multi-tiered application provides appropriate information to a downstream service when making a request so that the downstream service can authorize the request(s). This information can, in some cases, also include end-user credentials from the end-user originally making the request. The end-user and the upstream service can both obtain one or more security tokens from a trusted security token service to provide authentication and/or proof of authorization. Access to a security token can be based on a wide range of configurable policy settings, and can thus provide a high degree of security between application services.

For example, a method from the perspective of an upstream service in a multi-tier application of proving authority to communicate with one or more downstream services for a transaction can involve receiving an end-user request at an upstream service for one or more actions to be performed by a multi-tiered application system. In addition, the method can involve determining that the end-user request involves an action to be performed by a downstream service. The method can also involve requesting one or more security tokens from a security token service. In such a case, the one or more security tokens identify the upstream service. Furthermore, the method can involve creating a secure communication channel with the downstream service using at least one of the one or more security tokens, wherein the upstream service proves authority to communicate with the downstream service as a trusted subsystem. In addition, the method can still further involve sending the end-user request to the downstream service over the secure communication channel.

By contrast, a method from the perspective of a downstream service of authorizing communications with one or more upstream services can involve establishing a secure communication channel with an upstream service. In addition, the method can involve receiving a request from the upstream service to process data. In such a case, the request can include at least one identifier of the upstream service. The method can also involve determining that the at least one identifier is proves authority to make the request based on one or more policy settings. Furthermore, the method can involve returning a result to the upstream service over the secure communication channel, wherein the result is processed based on authority provided from the at least one identifier for the upstream service. As such, the result can be processed and returned based on authority for the upstream service.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
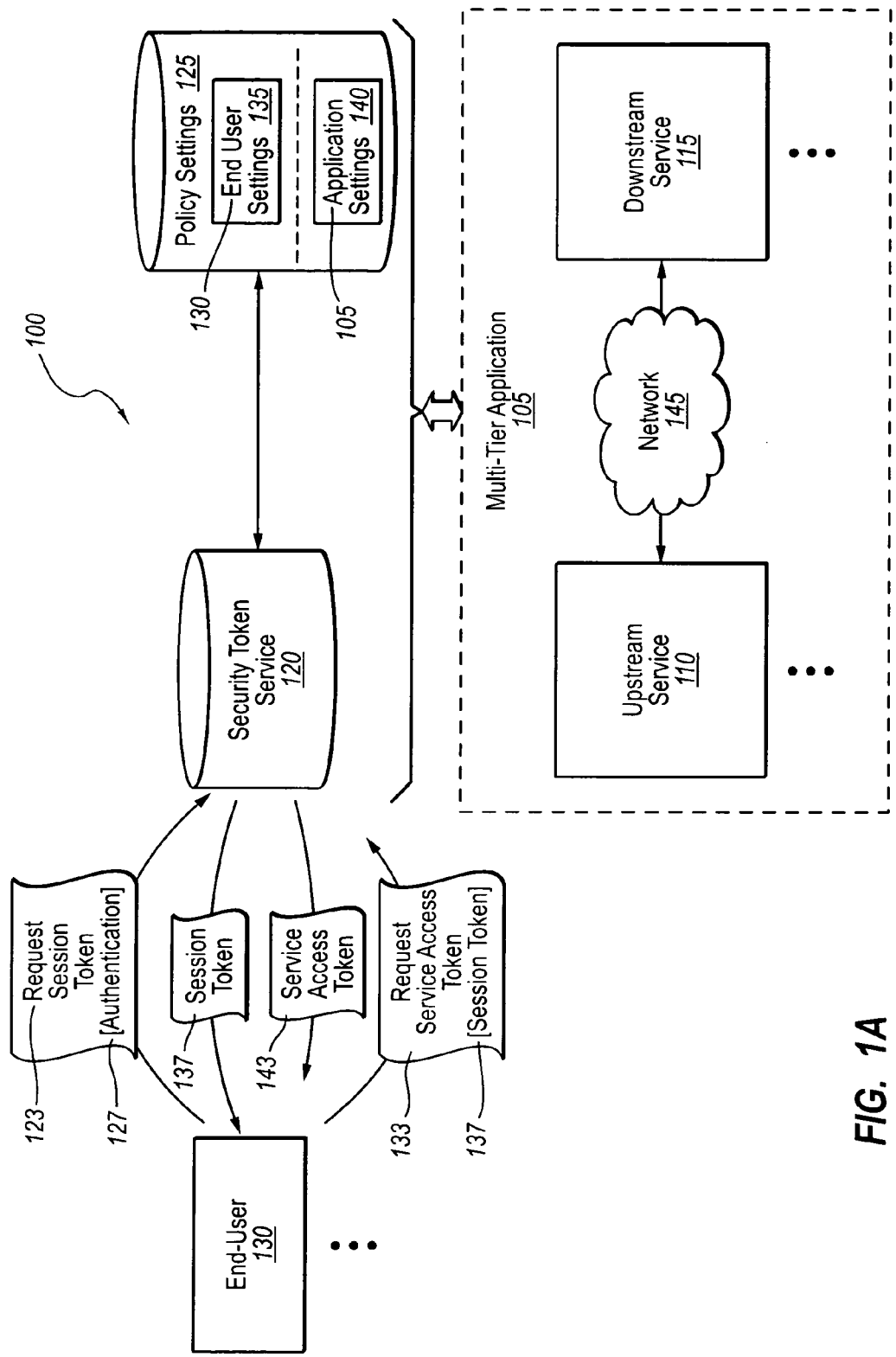
FIG. 1A illustrates an overview schematic diagram in accordance with one or more implementations of the present invention in which one or more end-users request one or more security tokens for communicating with a multi-tier application.

Implementations of the present invention extend to systems, methods, and computer program products configured to secure communications between services of a multi-tiered application system. In particular, implementations of the present invention provide components and mechanisms for securing communications between application services that may be operating at one or more different nodes. In one implementation, for example, an upstream service in a multi-tiered application provides appropriate information to a downstream service when making a request so that the downstream service can authorize the request(s). This information can, in some cases, also include end-user credentials from the end-user originally making the request. The end-user and the upstream service can both obtain one or more security tokens from a trusted security token service to provide authentication and/or proof of authorization. Access to a security token can be based on a wide range of configurable policy settings, and can thus provide a high degree of security between application services Accordingly, one will appreciate after reading the specification and claims herein that implementations of the present invention can be accomplished with a number of basic elements, including, for example, third-party token services. For example, implementations of the present invention include infrastructures for asserting trusted subsystems claims in a multi-tier, distributed application environment. These trusted subsystem claims can be managed and verified through a number of one or more centrally-managed trusted subsystem policies. In addition, these trusted subsystem claims can be inserted in one or more security tokens that are provided to one or more application services. An application service, therefore, prove its authority to request/perform one or more tasks (e.g., communicate) with another application service using a combination of the trusted subsystem claim and one or more security tokens.

Upon providing proper authority (e.g., authentication and/or authorization to perform one or more tasks) as such, the application service can also send identity claims about the original caller (i.e., end-user) to downstream services of the multi-tiered application in a more effective, secure manner. In particular, since the end-user can also be required to request one or more security tokens, implementations of the present invention can use a combination of application service tokens and end-user tokens to flow (i.e., send or pass with other data) identity claims to downstream application services. These different token types can thus satisfy various levels of security requirements that a wide range of services might use for accepting identity claims.

One will appreciate more fully herein, therefore, that an organization can limit or broaden service accessibility based on a wide range of factors, including types of tasks requested, when those tasks are requested, further limiting specific types of task requests to particular users, and so on. In at least one respect, this ability to add refinements to various authorization metrics (e.g., including authentication measures) allows a multi-tiered application to conform more readily to various "defense-in-depth" principles. In particular, the high degree of security configurability provided by implementations of the present invention can be used to limit access to higher value data to smaller and smaller numbers of entities (other services in the application, end-users, etc.)

FIG. 1A illustrates an overview schematic diagram of computerized environment 100 in which one or more end-users (e.g., 130) request one or more security access tokens (e.g., requests 123, 133) for communicating with a multi-tier application (e.g., 105). For example, end-user 130 may be communicating with a web service using Internet communication protocols, and may desire to access certain bank statement information, or execute one or more bank transactions handled by the multi-tier application. Similarly, end-user 130 may be communicating with a multi-tier application on a local area network, such as one or more database applications for directory, email, or other types of services, which may be distributed across several nodes. In some cases, therefore, upstream service 110 might be referred to as a "front-end" web service, while downstream service 115 might be referred to in some cases as an internal web service.

By way of explanation, implementations of the present invention generally refer herein to processing within a multi-tier application (e.g., 105). One will appreciate that multi-tier application 105 can be comprised of one or more discrete services (e.g., 110, 115). These various application services can be installed on the same physical computer system, and can also be installed on different physical computer systems (or nodes) within an organization network. For example, FIG. 1A shows that upstream service 110 communicates with downstream service 115 over network 145. Where some application services are installed at one node that generally refers traffic to another application at another node for additional processing, the referring application service can be thought of as "upstream," and the receiving application service can be thought of as "downstream."

Such designations, however, are somewhat arbitrary. For example, an upstream application could be considered a downstream service from the perspective of a different application service, and vice versa. Similarly, there can be several upstream application services, several downstream services, and even parallel application services, depending on network topology and application configurations. Accordingly, reference herein to an "upstream" or a "downstream" service primarily refers to services of a multi-tier application that are different from each other. Furthermore, the designations of "upstream" or "downstream," as used herein also refers to the notion that the "upstream" service will be typically be asking the "downstream" service to perform a particular action. Thus, one will appreciate more fully herein that there may be instances in which a downstream service and the upstream service may switch "upstream" or "downstream" roles for a particular transaction.

In any event, and in the illustrated example, FIG. 1A shows that end-user 130 first obtains one or more security tokens before communicating with multi-tier application 105. As previously mentioned, multi-tier application 105 might be an application used by a bank to provide account and transaction access. Accordingly, when user 130 attempts to log on, multi-tier application 105 requires end-user to be issued one or more security tokens from a trusted security token service, such as security token service 120. To do so, FIG. 1A shows that end-user first requests one or more session tokens with message 123. In one implementation, request 123 includes user authentication information 127, such as user name and password; while, in other implementations, authentication information 127 can also include X509 certificates, smart card information, biometric indicia, or the like.

FIG. 1A further shows that end-user 130 sends request 127 to a third-party token provider, such as security token service 120. In one implementation, security token service 120 is simply referred to by multi-tier application 105 when end-user 130 attempts to logon. Thus, end-user 130 may not be aware that security token service is a third party entity. In other cases, however, end-user 130 contacts security token service 120 directly before contacting multi-tier application. In either case, security token service 120 receives request 123 and checks the provided authentication 127 to grant a session token. For example, FIG. 1A shows that security token service 120 has authenticated the provided information 127, and thus replies to end-user 130 with session token 137.

End-user 130 can then use session token 137 to request a service access token, which provides authority to communicate with application service 110. For example, FIG. 1A also shows that end-user 130 sends request 133 for a service access token to security token service 120, providing as an argument the previously received session token 137. Using session token 137 in at least one implementation can allow end-user 130 to request a service access token without having to provide authentication information 127 a second time. In particular, session token 137 can be considered sufficient proof of authentication since authentication 127 was used to obtain the information.

Upon receiving request 137, security token service 120 may also consult a database 125 of one or more policy settings, which can include settings 135 for end user 130. In one implementation, end user settings 135 can include various allowances and end-user restrictions, such as which upstream and/or downstream services of multi-tier application 105 can be accessed, and for what types of transactions. Such policy settings 135 can further include information regarding whether a user will need to provide additional information for other types of transactions for other application services. These types of policy settings can be included in the service access token returned to the end-user. Thus, for example, FIG. 1A shows that security token service 120 returns service access token 143 to end-user 130.

Although FIG. 1A (and similar exchanges with other services herein) show session token 137 and service access token 143 being requested and received in separate transactions, such transactions can occur automatically, such that the distinctions are essentially transparent to the user. Thus, in some cases, end-user believes the entire process is part of a Single Sign-On ("SSO") process.

Figure 1B:
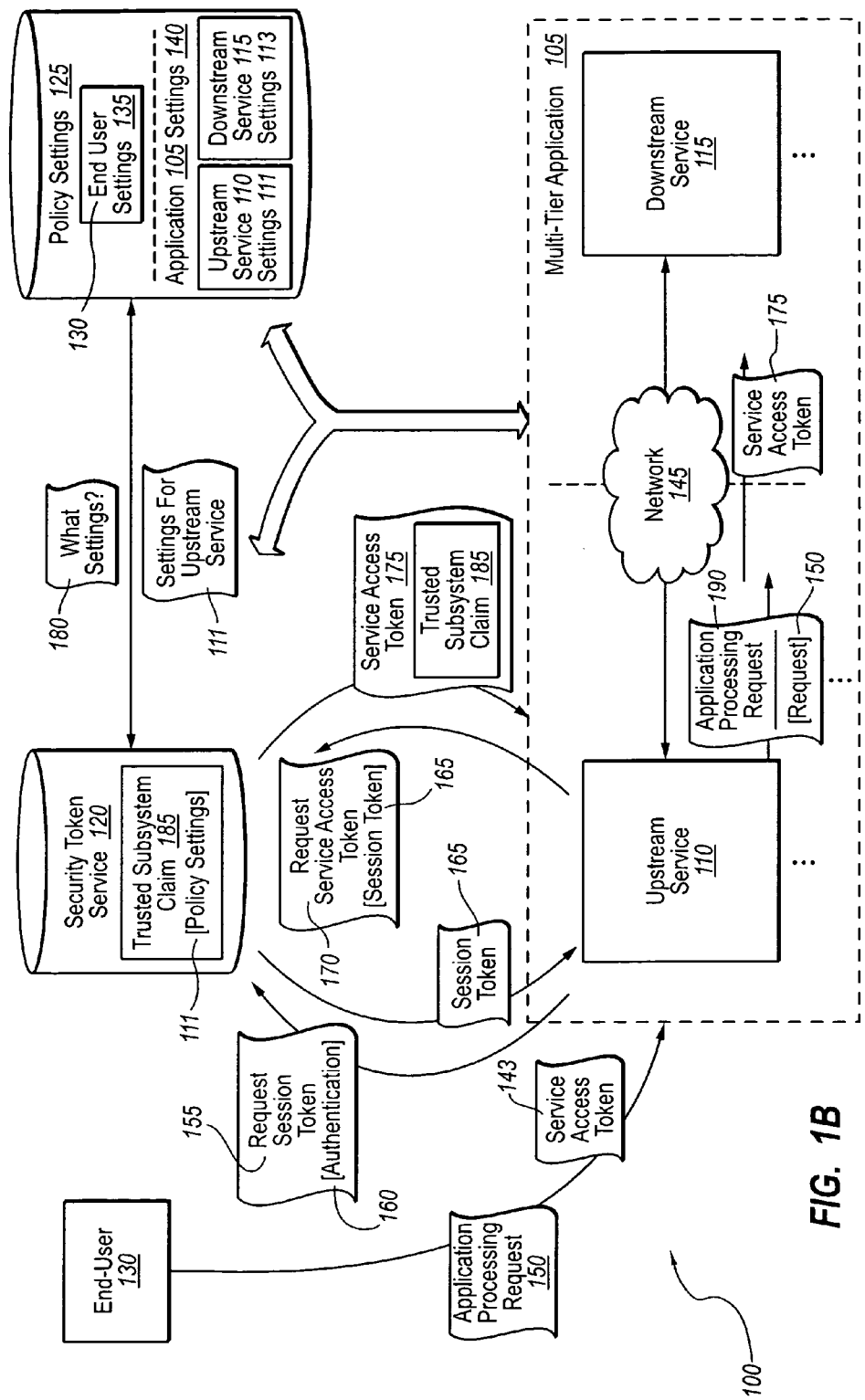
FIG. 1B illustrates the overview schematic diagram of FIG. 1A in which the end-user uses the one or more security tokens to request processing from the multi-tier application, and different services of the multi-tier application prove authority to communicate with each other through one or more different security tokens pursuant to processing the end-user request in accordance with one or more implementations of the present invention.

With the one or more security tokens (e.g., session token 137, service access token 143) in hand, end-user 130 is authorized to send application requests to multi-tier application 105. As shown in FIG. 1B, for example, end-user 130 makes an application request 150. As part, or just prior to, this request, end-user 130 establishes a secure communication channel with multi-tier application 105. In one implementation, establishing the secure communication channel includes exchanging one or more session keys with an upstream service (e.g., 110), such as a front-end web service. The session keys are traded in at least one implementation to enable cryptographic transforms of the following data in the communication channel. Thereafter, end-user 130 can send service access token 143 to multi-tier application 105, or can send some combination of the data from session token 137 and/or service access token 143. In addition, end-user can continue to provide verification with each application request message. For example, end-user 130 can include data from any of session token 137 and/or service access token 143 in any of the one or more application processing requests (e.g., 150).

Upon receipt, one or more upstream services (e.g., 110) of application 105 process the one or more application request messages (e.g., 150). In this particular example for request 150, upstream service 110 determines that request 150 involves additional processing at one or more downstream services (e.g., 110) of application 105. For example, request 150 might include a request to transfer funds from one bank account to another, and so involves sensitive database information not maintained at a front-end web service component of multi-tiered application 105. As described herein, however, an upstream service 110 will generally be prevented from communicating directly with a downstream service 115 without providing sufficient authority for doing so to the downstream service to which it is sending requests. In particular, upstream service 110 cannot simply provide the one or more security tokens from end user 130, but will need to receive its own security tokens from a trusted security token service.

Accordingly, FIG. 1B shows that upstream service 110 sends request 155 to security token service 120, which includes authentication information 160 for the upstream service. Generally, upstream service 110 can provide authentication information 160 in the form of any unique indium, such as a Global Unique Identifier ("GUID"), a network address, a shared secret, one or more digital certificates (e.g., an X509 certificate), or the like. Security token service 120 can then identify whether the provided indium is authentic and/or valid. In one implementation, for example, security token service 120 checks the provided indium against data for application 105 at policy settings database 125. In additional or alternative implementations, however, security token service 120 can also check one or more internal settings to verify authentication information 155. If the provided authentication information 155 is valid, security token service 120 can then send a session token (e.g., 165) to upstream service 110.

Generally, session token 165 for upstream service 110 will be different than session token 137 previously provided to end-user 130. This is at least in part so that session token 165 can later be used to uniquely identify upstream service 110. For example, and similar to what was illustrated and described with respect to FIG. 1A, upstream service 110 also sends a request 170 to security token service 120 for a service access token, which includes session token 165 as an argument. Ultimately, a service access token will allow upstream service 110 to make requests of an identified downstream service, at least in part by proving its authority to do so. Security token service 120 can then parse the request 170 to identify that the provided session token 165 is the same information as what was provided earlier to upstream service 110.

In addition, security token service 120 can compare the upstream service's request for security tokens with one or more settings (e.g., 111) in the policy settings database 125. For example, FIG. 1B shows that security token service 120 sends message 180 to policy settings database 125, requesting one or more clarifications on what upstream service 110 may or may not be allowed to request from another service. For example, upstream service 110 may be authorized to make only certain types of requests for downstream services (e.g., 115), or may only be authorized to make certain types of processing requests, can only make requests over certain secure channels using certain security protocols, or make requests on behalf of only certain end-users, and so forth. Application settings 140 can also include settings 113 for downstream service 115, which can include similar types of information as settings 111, though likely on a more limited level.

FIG. 1A thus shows that security token service 120 thus receives data associated with settings 111 from policy settings database 125. If settings 111 indicate that upstream service 110 is allowed to communicate with downstream service 115, then security token service 120 can prepare a trusted subsystem claim (i.e., 185). In general, the trusted subsystem claim can include any appropriate information that would allow downstream service 115 to readily identify upstream service 110 as a "trusted subsystem" authorized to make particular types of requests as allowed through policy settings database 125. In this particular example, therefore, FIG. 1A shows that security token service 120 creates trusted subsystem claim 185, and inserts this claim within service access token 175. The following example code illustrates one possible trusted subsystem claim using the Security Assertion Markup Language ("SAML").

EXAMPLE 1

```
<saml:AuthorizationDecisionStatement Decision="Permit"
Resource="http://downstreamservice.multitierwebservice.com">
    <saml:Actions Namespace="http://...">
        <saml:Action>PropagateIdentities</saml:Action>
    </saml:Actions>
    <saml:Subject>
        <saml:NameIdentifier
        Name="http://frontendservice.multitierwebservice.com"/>
    </saml:Subject>
</saml:AuthorizationDecisionStatement>
```

In this example, the upstream service identified by the URI http://frontendservice.multitierwebservice.com is a trusted subsystem permitted to propagate identities to the downstream service identified by the URI http://downstreamservice.multitierwebservice.com.

Before sending service access token 175, however, security token service 120 can also sign trusted subsystem claim 185, at least in part so that another party will be unable to modify the corresponding claim data. There are a number of ways By in which security token service 120 can sign trusted subsystem claim 185, including, for example, the use of private and/or public keys, symmetric key cryptography methods, or the like. In any event, the signing of trusted subsystem claim 185 will generally be such so that downstream service 115 will readily recognize the signature as coming from a trusted security token service, such as security token service 120. After signing the trusted subsystem claim, security token service 120 sends token 175 to upstream service 110. Upstream service 110 can then use its received one or more security tokens to authenticate with and prove sufficient authority to pass processing requests to downstream service 115.

Before sending application requests to downstream services, however, upstream service 110 will need to establish a secure communication session/channel with the downstream service 115. To do so, upstream service 110 can exchange one or more session keys (not shown) with downstream service 115, which can be used as cryptographic transforms in the data that follows. In at least one implementation, creating the secure communication channel further includes the upstream service 110 sending information from security token 175 in order to provide authentication about the trusted status for upstream service 110. Upon receipt of security token 175, downstream service 115 can also check to see if service access token 175 contains a trusted subsystem claim, such as trusted subsystem claim 185.

In one implementation, downstream service 115 can check this information against cache. For example, downstream service 115 can maintain a local data structure (not shown) that caches information about upstream callers (e.g., upstream service 110) associated with the established secure communication channel. In such a case, downstream service 115 might be configured to set, for example, a binary bit flag in the local data structure indicating that the entity making the request is a trusted subsystem. Downstream service 115 can also be configured to use other bit fields—and more sophisticated bit combinations—to distinguish between different types of trusted subsystems. If, for example, downstream service 115 needs to distinguish between a billing service and an identity propagation service in application 105, downstream service 115 might be configured to differentiate the two services with the bit representations 0x00000001 and 0x0000002, respectively. Of course, an organization might simply choose not to cache such information, or any information at all.

Nevertheless, once upstream service 110 and downstream service 115 have setup the secure communication channel and authenticated each other, and upstream service 110 has provided sufficient proof of authority to perform a particular transaction (i.e., by providing the trusted subsystem claim) upstream service 110 can begin sending application requests (e.g., 190) to the downstream service. For example, FIG. 1B shows that upstream service 110 has established a secure communication channel (not shown) in part with service access token 175, or corresponding data. Upstream service 110 then sends one or more application processing requests 190, which can include data previously received from end-user request 150. Downstream application 115 can thus process the information and return any appropriate results back to upstream service 110.

If the secure communication channel is ever interrupted, implementations of the present invention can also allow the various application services to reconstruct states of the security session without using a server-side database. In such a case, the relevant application service can actually re-compute trusted subsystem claim 185. In one implementation, for example, trusted subsystem claim 185 is encoded and included in one or more secure conversation tokens that are transmitted from upstream service 110 to downstream service 115. As such, downstream service 115 can continually determine if upstream caller 110 is a trusted subsystem (i.e., trusted application service) authorized to request particular tasks without the benefit of a local data structure.

In addition to transmitting application data 190, upstream service 110 can also transmit identity claims in some situations about the original caller (i.e., end-user 130). In general, upstream service can flow (i.e., pass, or send) such identity claims (not shown) as an element within one or more Simple Object Access Protocol ("SOAP") headers. For example, upstream service 110 might flow identity claims in three different types of tokens: 1) a token generated by upstream service 110; 2) a third-party generated token; and 3) a token digitally signed by an end-user.

The token generated by upstream service 110 can be as simple as, for example a "ws-security" user name token that does not include the password element. Alternatively, this token could be as complicated as a custom identity token that contains non-standard claims inserted by upstream service 110. However created, upstream service 110 can sign the token before propagating the token to downstream service 115. Example 2 below is a simple example of a token that uses a "UsernameToken" to propagate the context of the original caller.

EXAMPLE 2

```
<OriginalCaller>
    <UsernameToken>
        <Username>...</Username>
    </UsernameToken>
</OriginalCaller>
```

Example 3 below illustrates a more complicated example of trusted subsystem generated identity claim based on the name of the "original caller."

EXAMPLE 3

```
<OriginalCaller>
    <CustomUserContextToken
    Issuer="http://trustedsubsystem1.multitierwebservices.com">
        <Username>...</Username>
        <Roles>...</Roles>
    </CustomUserContextToken>
</OriginalCaller>
```

In addition to the name of the original caller, the custom token issued by upstream service 110 can also contain application roles (e.g., pertaining to settings 135) to which end-user 130 belongs. Such information may help downstream services (e.g., 115) make access decisions.

The second type of token can be created by a trusted third-party, e.g., security token service 120, who is trusted to perform a set of specialized functions. As described herein, for example, security token service 120 can be configured to provide authentication, authorization and single sign-on services to Web services. Example 4 below, therefore, provides one way an upstream service (e.g., 110) can propagate a signed SAML identity token issued by security token service 120 for single sign-on services.

EXAMPLE 4

```
<OriginalCaller>
    <saml:Assertion AssertionId="SecurityToken-745d68f1-9c63-
    4216-9fd5-9ebd96fab986" MajorVersion="1"
    MinorVersion="1" Issuer="http://sso-
    sts.multitierwebservices.com" ...>
    ...
    <ds:signature>...</ds:signature>
    </saml:Assertion>
</OriginalCaller>
```

The third type of token is one that can be generated and signed by the end-user (e.g., 130) who originated the initial application processing request (e.g., 150). The signature in the identity claim enables, for example, upstream service 110 and downstream service 115 to verify that the asserted identity claim is present. Example 5 below, therefore, provides an example of a self-signed token (e.g., signed by end-user 130) that can be used to correlate an application request (e.g., request 190 including data from request 150) with the original caller (e.g., end-user 130).

EXAMPLE 5

```
<OriginalCaller>
    <CallerEvidenceToken>
        <Subject>
            <X509CertficateToken>...</X509CertificateToken>
        </Subject>
        <Timestamp>...</Timestamp>
        <MessageID>uuid: 5b19a5f5-426c-4cfa-b953-
d5dc200e9508</MessageID>
        <Signature>...</Signature>
    </CallerEvidenceToken>
</OriginalCaller>
```

In this example, the original caller has attached an X509 certificate that can be used to authenticate the original caller. In addition, this example denotes use of a timestamp element, which indicates the time when the end user generated the evidence. Furthermore, this example shows use of a message identifier that can be used to identify the chain of application requests initiated by the original caller. As such, the timestamp and message identifier can then be signed using the private key associated with the X509 certificate.

In any event, upstream service 110 can sign the identity claims using a key derived from the session key(s) previously exchanged with downstream service 115. The derived key used to sign the identity claims can also be the same key (e.g., a symmetric key) that upstream service 110 used to sign other parts of the SOAP header and/or body. In addition, upstream service 115 might further encrypt the one or more identity claims after signing them. As with signing the identity claims, upstream service 110 might derive an encryption key from the previously exchanged session key(s). The key used for encryption can even be the same key that is used to encrypt other parts of the SOAP header and/or body. One will appreciate, of course, that the information structure of the flowed identity claims may take different forms in accordance with other levels and/or types of security requirements.

When downstream service 115 receives an application request (e.g., 190) with the flowed identity claim (not shown), downstream service 115 can first verify the signature on the message. In one implementation downstream service 115 verifies that the signature is appropriate, and that the signature was signed by upstream service 110 to thereby identify that the one or more identity claims have not been tampered with by potentially malicious party. Downstream service 115 can also verify that the signer making request 190 is a trusted subsystem (e.g., the signer provides a trusted subsystem claim, such as claim 185, in its requests), which has authority to make the request. Thus, downstream service 115 performs one or more validation operations to identify that the entity making the request is an authorized application 105 service that is allowed based on policy settings (e.g., 111, and/or 113) to flow identity claims for end-user 130. In one implementation, downstream service 115 can verify this information by checking a trusted subsystem bit field, such as previously described for a local data structure (not shown), or by checking for the presence of trusted subsystem claim 185 in a secure conversation token (e.g., service access token 175).

In certain cases, a downstream service (e.g., 115) receiving a propagated identity from a trusted subsystem (e.g., upstream service 110) may also need additional evidence in order to accept the "flowed" identity claims before processing the application request(s) (e.g., 190). In one implementation, for example, downstream service 115 can also request additional identity information from upstream service 110 regarding end-user 130, such as user name or password information, a digital signature, or the like. In addition, downstream service 115 may be configured to require additional evidence from security token service 120 to support the received identity claims. Such additional evidence can take many forms, and operate under a number of different considerations. For example, downstream service 115 might need to identify that security token service 120 has "recently" authenticated upstream service 110 in order to reduce the time window a trusted subsystem claim is valid. Thus, downstream service 115 might request a token signed by the security token service 120 and issued to the end-user 130 as a proof that end-user 130 has recently been authenticated by a trusted third party.

Figure 2:
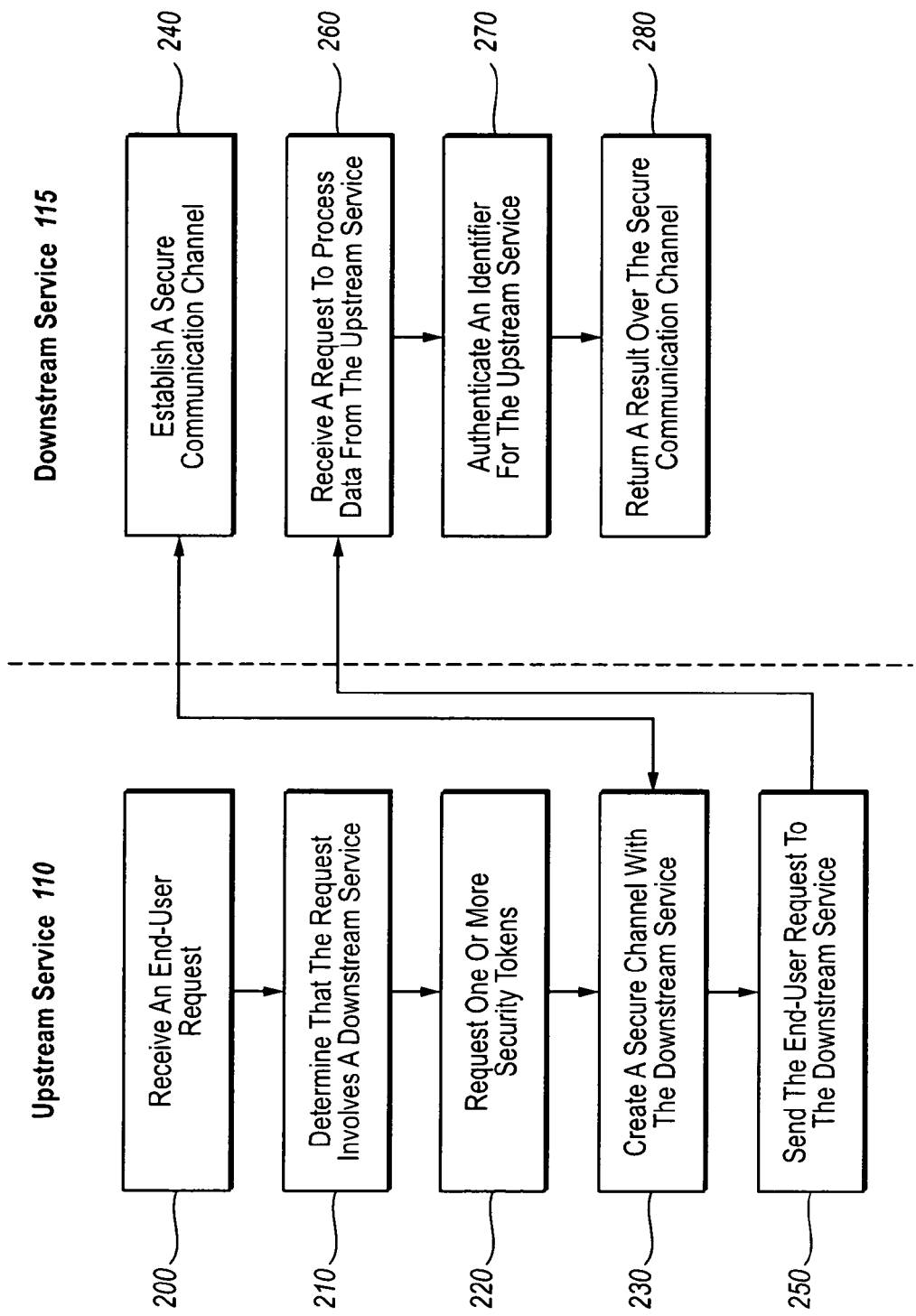
FIG. 2 illustrates flowcharts from the perspective of an upstream service and a downstream service in a multi-tier application of methods comprising one or more acts for authorizing communication between the services.

Accordingly, FIGS. 1A-1B illustrate a number of schematics and components in which one or more application services can authenticate their own identity(ies) with other application services, and prove authority (or authorize) for particular outside entity requests. In addition to the foregoing, implementations of the present invention can also be described in terms of flowcharts of methods comprising one or more acts for a particular result. For example, FIG. 2 illustrates flowcharts from the perspective of upstream service 110 and downstream service 115 for authorizing the services when making processing requests. The flowcharts and corresponding text of FIG. 2 are described below with reference to the diagrams of FIGS. 1A-1B.

For example, FIG. 2 shows that a method from the perspective of upstream service 110 of authenticating communications with the one or more downstream services can comprise an act 200 of receiving an end-user request. Act 200 includes receiving an end-user request at an upstream service for one or more actions to be performed by a multi-tiered application system. For example, upstream service 110 establishes a secure communication channel with end-user 130, and application processing request 150.

In addition, FIG. 2 shows that the method from the perspective of upstream service 110 can comprise an act 210 of determining that the request involves a downstream service. Act 210 includes determining that the end-user request an action to be performed by a downstream service. For example, upstream service 110 may be a front-end web service of application 105 implemented at a bank. Request 150 may include one or more requests for sensitive transaction data that is not ordinarily handled by upstream service 110. As such, upstream service 110 identifies that the request can involve further processing via downstream service 115.

FIG. 2 also shows that the method from the perspective of upstream service 110 can comprise an act 220 of requesting one or more security tokens. Act 220 includes requesting one or more security tokens from a security token service, wherein the one or more security tokens identify the upstream service. For example, upstream service 110 sends request 155 to security token service 120 for a session token, wherein request 155 includes various authentication information 160. Upon receiving session token 165, upstream service 110 sends request 170 to security token service 120 for a service access token, where request 170 includes the previously received session token 165. Both authentication information 160 and session token 165 uniquely identify upstream service 110 to security token service 120.

Furthermore, FIG. 2 shows that the method from the perspective of upstream service 110 can comprise an act 230 of creating a secure channel with the downstream service. Act 230 includes creating a secure communication channel with the downstream service using at least one of the one or more security tokens, wherein the downstream service proves authority (e.g., providing authentication, and/or authority data) to communicate with the downstream service as a trusted subsystem. For example, upstream service 110 and downstream service 115 exchange session keys in a session key exchange phase. In addition, FIG. 1B shows that upstream service 110 can send any service access token 175 to downstream service 115. Upon establishing a secure communication channel by, for example, exchanging session keys, downstream service 115 identifies whether communication is appropriate by identifying the presence of a trusted subsystem claim 185. If downstream service 115 can appropriately authenticate and authorize upstream service 110 through the trusted subsystem claim 185, downstream service 115 can accept application processing requests (e.g., 190).

As such, FIG. 2 further shows that the method from the perspective of upstream service 110 can comprise an act 250 of sending the end-user request to the downstream service. Act 250 includes sending the end-user request to the downstream service over the secure communication channel. For example, upstream service 110 sends application processing request 190, which includes data of request 150 previously received from end-user 130.

By contrast, and in addition to the foregoing, FIG. 2 shows that a method from the perspective of downstream service 115 of authenticating communications with the one or more upstream services can comprise an act 240 of establishing a communication channel. Act 240 includes establishing a secure communication channel with an upstream service. For example, as previously described, downstream service 115 can exchange session keys with upstream service in a key exchange phase, which can also include receiving one or more security tokens (e.g., 165, 175) from upstream service 110.

In addition, FIG. 2 shows that the method from the perspective of downstream service 115 can comprise an act 260 of receiving a request to process data from the upstream service. Act 260 includes receiving a request from the upstream service to process data, wherein the request includes at least one identifier of the upstream service. For example, upon establishing a secure communication channel, downstream service 115 can receive application processing request 190, where request 190 can include end-user request data 150, as well as data from any of the one or more security tokens.

Furthermore, FIG. 2 shows that the method from the perspective of downstream service 115 can comprise an act 270 of authenticating an identifier for the upstream service. Act 270 includes determining that the at least one identifier proves authority to make the request based on one or more policy settings. For example, downstream service 115 can identify and authenticate trusted subsystem claim 185 in any of service access token 175 and/or application processing request 190 (when included). Trusted subsystem claim 185 further comprises data at least from policy settings 111 for upstream service 110. If downstream service 115 can authenticate the trusted subsystem claim for this transaction, then downstream service can authenticate the identity of upstream service 110, and process the request.

Still further, FIG. 2 shows that the method from the perspective of downstream service 115 can comprise an act 280 of returning a result over the secure communication channel. Act 280 includes returning a result to the upstream service over the secure communication channel, wherein the result is processed based on authority provided from the at least one identifier for the upstream service. For example, upon identifying and authorizing that upstream service 110 is a trusted subsystem, downstream service 115 processes the request transaction and forwards the processed data back to upstream service 110.

Accordingly, implementations of the present invention provide a number of systems, components, and mechanisms for authenticating the identities of application services in a multi-tiered application in a reliable and trusted fashion. In particular, implementations of the present invention allow application services to properly authenticate each other without necessarily relying on impersonation, or "acting on behalf" mechanisms that involve primarily authenticate the requesting end-user. In particular, the above-described components and systems can help downstream services find out with whom they are talking before accepting processing requests. This can provide a number of benefits, and can help organizations continue to deploy distributed application services where desired otherwise minimizing important security considerations, such as relate to the defense-in-depth principle.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. At an upstream service in a computerized environment in which the upstream service and one or more downstream services comprise a multi-tiered application system, a method of proving authority to communicate with the one or more downstream services, comprising the acts of:
   receiving an end-user request at an upstream service for one or more actions to be performed by a multi-tiered application system;
   determining that the end-user request involves an action to be performed by a downstream service, wherein the upstream service require its own security tokens from a trusted security source in order to communicate with the downstream service;
   the upstream service requesting a session token from a security token service, the request including authentication information for the upstream service;
   the upstream service requesting a session token from the security token service, the session token uniquely identifying the upstream service;
   the upstream service requesting a upstream service access token from the security token service, the upstream service access token request including the received session token, the upstream service access token allowing the upstream service to make requests of the downstream service;
   the upstream service receiving the upstream service access token from the security token service, the upstream service access token including a trusted subsystem claim which allows the downstream service to identify the upstream service as a trusted subsystem;
   the upstream service authenticating with the downstream service and proving sufficient authority to pass processing requests to the downstream service using at least the upstream service access token including the trusted subsystem claim;
   the upstream service establishing a secure communication channel with the downstream service using at least the upstream service access token, wherein the upstream service proves the upstream service is trusted to the downstream service and has authority to communicate with the downstream service as a trusted subsystem with the one or more security tokens identifying the upstream; and
   the upstream service sending the end-user request to the downstream service over the secure communication channel.

2. The method as recited in claim 1, wherein the end-user request comprises one or more tokens that identify the end-user.

3. The method as recited in claim 1, wherein creating the secure communication channel further comprises an act of the upstream service exchanging one or more session keys with the downstream service.

4. The method as recited in claim 3, further comprising an act of sending one or more identity claims with application data transmitted to the downstream service.

5. The method as recited in claim 3, further comprising an act of signing the one or more identity claims with one of the one or more exchanged session keys.

6. The method as recited in claim 3, further comprising an act of encrypting at least a portion of the application data with an encryption key derived from one of the one or more exchanged session keys.

7. The method as recited in claim 1, further comprising:
   the upstream service exchanging one or more session keys with the end user; and
   the upstream service establishing a secure communication channel with the end user.

8. The method as recited in claim 7, wherein the upstream service access token comprises one or more trusted subsystem claims.

9. The method as recited in claim 8, wherein the one or more trusted subsystem claims have been signed by the security token service, such that a different party is prevented from modifying the one or more trusted subsystem claims.

10. The method as recited in claim 8, wherein the one or more trusted subsystem claims comprise one or more policy settings for any one or more of the upstream service or downstream service, wherein the one or more policy settings limit access by the upstream service to the downstream service.

11. A computer program product for implementing a method at an upstream service in a computerized environment in which the upstream service and one or more downstream services comprise a multi-tiered application system, the computer program product comprising:
   a computer-readable storage device having computer-executable instructions stored thereon that, when executed, cause one or more processors at the upstream service to perform a method of proving authority to communicate with the one or more downstream services, the method comprising the method of claim 1.

12. The computer product of claim 11, wherein the method further includes:
   after sending the end-user request to the downstream service, receiving from the downstream service processed data, wherein the processed data resulted from the downstream service processing the end-user request as a transaction.

* * * * *